United States Patent
Allen et al.

(10) Patent No.: US 7,581,477 B2
(45) Date of Patent: *Sep. 1, 2009

(54) SAW TABLE AND CLAMPING MECHANISM THEREFOR

(75) Inventors: Clyde G Allen, Metamora, MI (US); Aundrea Nurenberg, Brown City, MI (US); Todd M. Lajewski, Lapeer, MI (US); Michael C. Clark, Columbiaville, MI (US); Richard J. Logan, Oxford, MI (US)

(73) Assignee: Tapco International, Wixom, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/107,653

(22) Filed: Apr. 22, 2008

(65) Prior Publication Data
US 2008/0196568 A1   Aug. 21, 2008

Related U.S. Application Data

(63) Continuation of application No. 10/961,869, filed on Oct. 8, 2004, now Pat. No. 7,373,865.

(60) Provisional application No. 60/567,213, filed on Apr. 30, 2004.

(51) Int. Cl.
*B26D 7/02* (2006.01)

(52) U.S. Cl. .................... 83/454; 83/455; 83/574; 83/523; 269/81

(58) Field of Classification Search ............... 83/455, 83/454, 523; 269/74, 81, 134
See application file for complete search history.

(56) References Cited

U.S. PATENT DOCUMENTS

| 729,964 | A | * | 6/1903 | Scherer ................... 83/455 |
| 927,747 | A | * | 7/1909 | McCormick ............. 269/74 |
| 2,116,263 | A | * | 5/1938 | Harbaugh ................ 269/45 |
| 2,609,014 | A | * | 9/1952 | Schwantes .............. 83/455 |
| 2,612,914 | A | * | 10/1952 | Reynolds ............ 144/250.18 |
| 2,968,325 | A |  | 1/1961 | Wandvik |
| 2,991,669 | A | * | 7/1961 | Stock ..................... 269/154 |
| 3,532,018 | A | * | 10/1970 | Szabo .................... 83/455 |
| 3,942,783 | A | * | 3/1976 | Neef et al. ............ 270/30.05 |
| 3,970,296 | A | * | 7/1976 | Rameson ................ 269/32 |
| 4,007,657 | A |  | 2/1977 | Burch |
| 4,046,041 | A |  | 9/1977 | Stolzer |
| 4,096,777 | A |  | 6/1978 | Adams |
| 4,320,678 | A |  | 3/1982 | Volk |
| 4,452,070 | A | * | 6/1984 | Kipp ..................... 73/49.8 |
| 4,489,634 | A |  | 12/1984 | Volk |
| 5,069,097 | A | * | 12/1991 | Mori ..................... 83/56 |
| 5,090,283 | A |  | 2/1992 | Noble |
| 5,103,704 | A |  | 4/1992 | Spath et al. |

(Continued)

*Primary Examiner*—Kenneth E. Peterson
*Assistant Examiner*—Sean Michalski
(74) *Attorney, Agent, or Firm*—Howard & Howard Attorneys PLLC

(57) ABSTRACT

A saw table includes a clamping mechanism for clamping a work piece on the saw table. The clamping mechanism includes a clamping bar having a first end and a second end. A longitudinal axis is defined between the first and second ends. A first pivoting arm is operatively connected to one of the ends of the clamping bar to support the clamping bar for rotation about a pivot axis. A biasing device biases the clamping bar about the pivot axis to clamp the work piece between the clamping bar and a table base.

20 Claims, 5 Drawing Sheets

U.S. PATENT DOCUMENTS

| | | |
|---|---|---|
| 5,239,905 A | 8/1993 | Dunn |
| 5,269,356 A | 12/1993 | Bartz |
| 5,287,900 A | 2/1994 | Falco |
| 5,301,726 A | 4/1994 | Wojcik |
| 5,312,097 A * | 5/1994 | Womack ..................... 269/139 |
| 5,335,573 A | 8/1994 | Rogers |
| 5,442,984 A | 8/1995 | Tate |
| 5,452,752 A | 9/1995 | Aigner |
| 5,456,397 A * | 10/1995 | Pedrini ....................... 224/324 |
| 5,489,075 A * | 2/1996 | Ible ............................ 248/104 |
| 5,682,934 A | 11/1997 | Rybski |
| 5,765,820 A * | 6/1998 | Marusiak ......................... 269/6 |
| 5,819,626 A | 10/1998 | Lucas |
| 5,924,348 A * | 7/1999 | Schelli, III ................... 83/455 |
| 6,041,837 A | 3/2000 | Hanson |
| 6,116,304 A | 9/2000 | Wilson et al. |
| 6,488,256 B1 | 12/2002 | Chang |
| 6,672,190 B2 | 1/2004 | Taylor |
| 6,990,882 B2 | 1/2006 | Schonfelder |
| 7,249,548 B2 * | 7/2007 | Blanco et al. ................. 83/455 |
| 7,373,865 B2 * | 5/2008 | Allen et al. ................... 83/454 |
| 2001/0011564 A1 | 8/2001 | Darling |
| 2006/0260455 A1* | 11/2006 | Yeghiayan et al. ............ 83/455 |

* cited by examiner

SAW TABLE AND CLAMPING MECHANISM THEREFOR

RELATED APPLICATION

This application is a Continuation of U.S. Non-Provisional patent application Ser. No. 10/961,869 filed Oct. 8, 2004, which claims the benefit of U.S. Provisional Patent Application Ser. No. 60/567,213 filed Apr. 30, 2004, both of which are incorporated herein by reference.

BACKGROUND OF THE INVENTION

1. Field of the Invention

The subject invention relates to a saw table and, more specifically, a clamping mechanism for use on a saw table.

2. Description of the Prior Art

Saw tables are known in the building construction and remodeling industry. Typically, a saw is mounted on the saw table for cutting a work piece, such as vinyl siding, aluminum siding, tile, steel, half-wrapped log siding, textured ceiling tile, etc. Since cutting such materials by hand leads to inaccurate and unusable parts, which then must be scrapped, the saw tables have gained wide appeal in the above-mentioned industries.

The saw table typically includes a table base, which stabilizes the work piece and allows a user to precisely position the work piece with respect to the saw to perform desired cuts of various angles and orientations. A pair of tracks extend parallel to each other across the saw table, and a saw cradle is slidably supported by the tracks for rectilinear movement along the tracks.

For performing the desired cuts on saw tables of the prior art, the work piece is positioned on the table base at a desired angle in relation to the saw. The work piece is held in place, usually by hand, to perform the operation. Thus, significant care must be taken by operators to keep hands out of the path of the saw while preventing the work piece from deviating from the desired position. In response to this problem, several solutions have been developed in the prior art.

For example, it is known to provide a C-clamp on the table base described above for holding the work piece in place. Although the C-clamp is an inexpensive solution to the aforementioned problem of holding the work piece in place, multiple C-clamps are necessary are different points along a length of the work piece to prevent the work piece from rotating when contacted by the saw. In addition, installing the C-clamps to clamp the work piece against the table base is tedious, labor-intensive, time-consuming, and inefficient.

More elaborate clamping mechanisms have also been developed for clamping the work piece on the saw table. U.S. Pat. No. 5,103,704 discloses a saw table that includes an actuation bar having a first end and a second end operatively connected to clamping blocks. The clamping blocks are each disposed on a guide rod. A first pivoting screw is connected to the first end of the actuation bar, and a second pivoting screw is connected to the second end of the clamping bar. The screws are threaded through the respective clamping blocks for pivotal movement about a pivot axis. The pivotal movement of the screws clamps or releases the clamping blocks from the guide rods. Thus, the clamping bar may be pivoted in one direction to clamp the clamping blocks, and thus the work piece, and in the opposite direction to release the clamping blocks. However, such a clamping mechanism is complicated and requires numerous moving parts that function together to perform the clamping function. This increases the cost of the saw table, yet is still labor-intensive. Operation of the clamping mechanism by clamping and releasing the mechanism may also be tedious, labor intensive, time consuming, and inefficient. Furthermore, the clamping mechanism has set positions, and cannot compensate for work pieces of various thicknesses during operation without preadjustment for the specific work piece on the saw table. As a result, insufficient or excessive clamping force may be provided by the clamping mechanism absent further features that add even more complexity to the clamping mechanism.

Despite the efforts in the prior art to develop the aforementioned clamping mechanisms, there remains an opportunity to develop less complex clamping mechanisms that are less expensive, yet improve the speed and efficiency with which the work piece may be clamped to the table base without sacrificing the stability or clamping force with which the work piece is clamped to the table base.

SUMMARY OF THE INVENTION AND ADVANTAGES

The subject invention provides a saw table and a clamping mechanism for use on the saw table. The clamping mechanism includes a clamping bar having a first end and a second end. A longitudinal axis is defined between the first and second ends. A first pivoting arm is operatively connected to one of the ends of the clamping bar to support the clamping bar for rotation about a pivot axis. A biasing device biases the clamping bar about the pivot axis to clamp a work piece between the clamping bar and a table base.

The biasing device allows the clamping mechanism to accommodate work pieces of various thicknesses while providing a preset clamping force on the work piece, regardless of the thickness of the work piece. Furthermore, the biasing device provides all of the necessary force to maintain the work piece in position, and the work piece may by positioned with maximized efficiency by lifting the clamping bar and sliding the work piece beneath the clamping bar, and sliding the work piece out from beneath the clamping bar to remove the work piece from the saw table.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
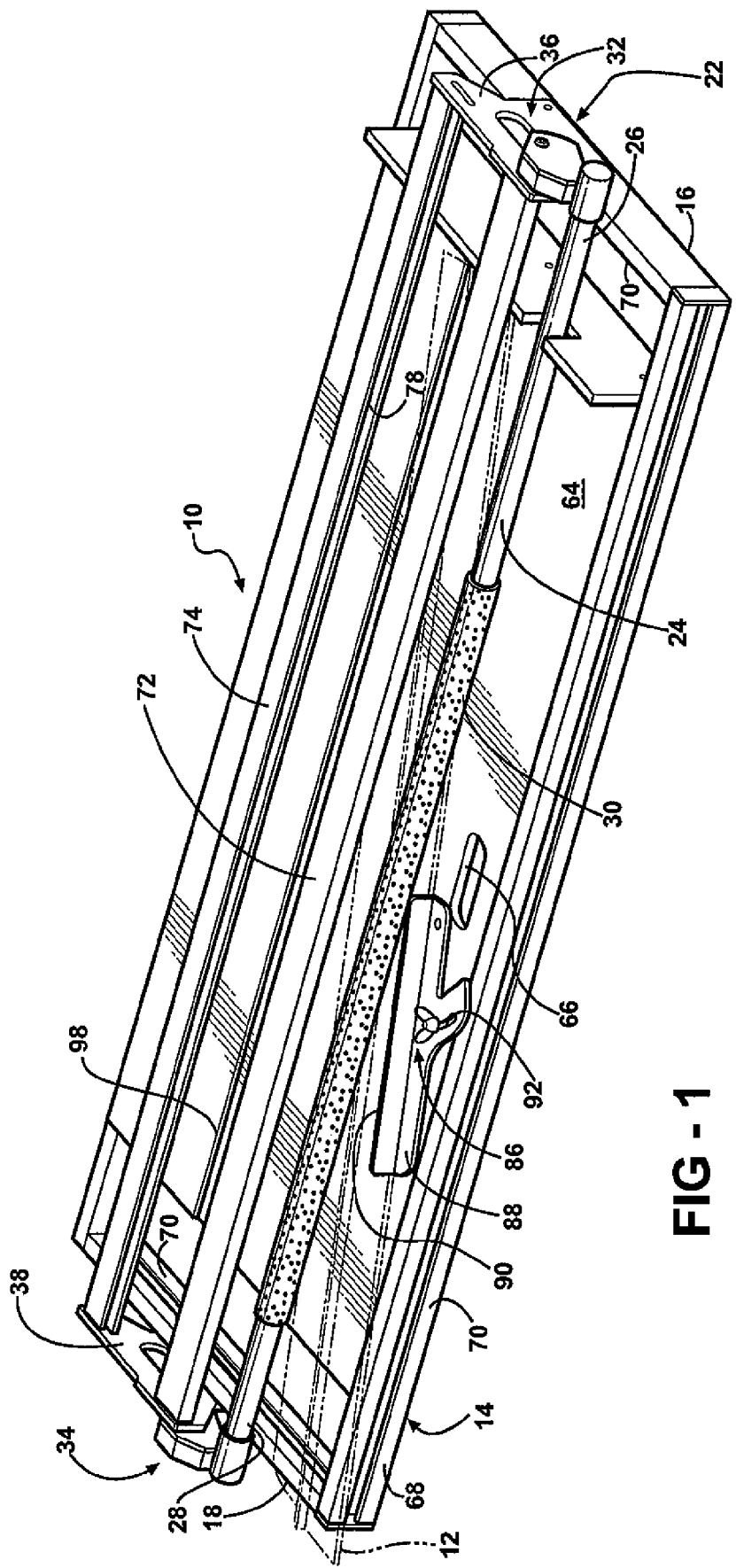
FIG. 1 is a perspective view of a saw table including a clamping mechanism.

A saw table is shown generally at 10 in FIG. 1. The saw table 10 is used for positioning and cutting a work piece 12 (shown in phantom lines in FIGS. 1 and 3-6), which may include vinyl siding, aluminum siding, tile, steel, half-wrapped log siding, textured ceiling tile, etc. The saw table 10 includes a table base 14 having a first base end 16 and a second base end 18. The table base 14, to be described in further detail below, stabilizes the work piece 12 and allows a user to precisely position the work piece 12 to perform desired cuts of various angles and orientations.

Figure 4:
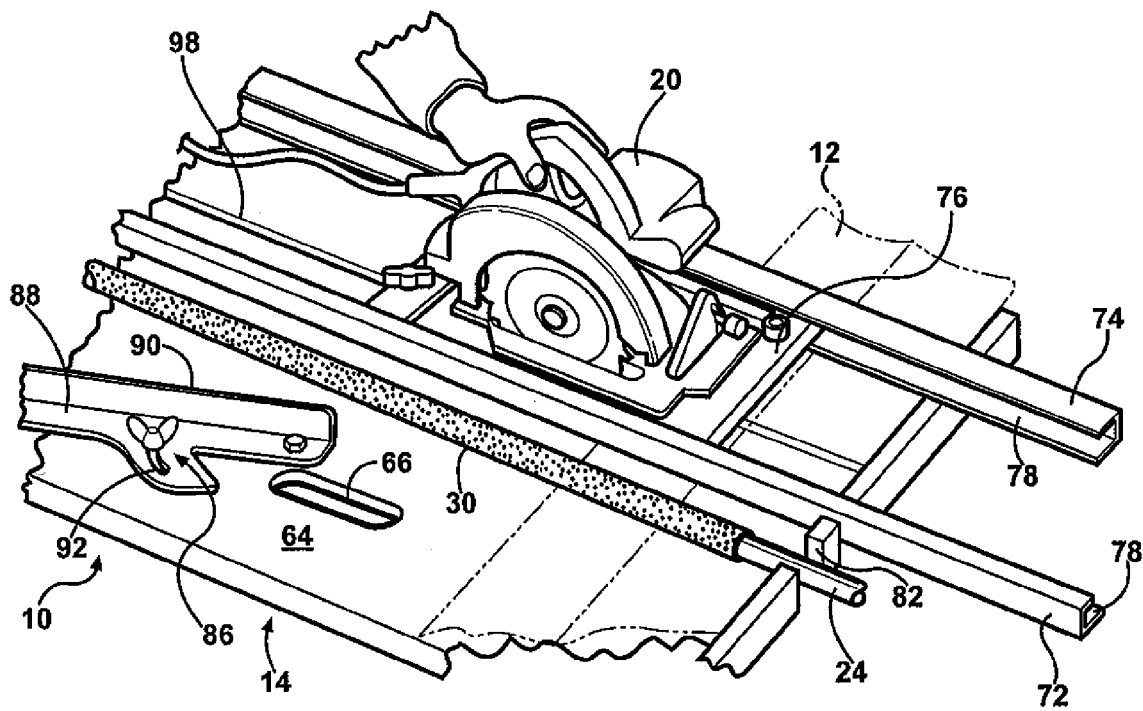
FIG. 4 is a partial perspective view of the saw table of FIG. 1 showing a saw cutting a work piece and a clamping bar clamping the work piece.
Figure 5:
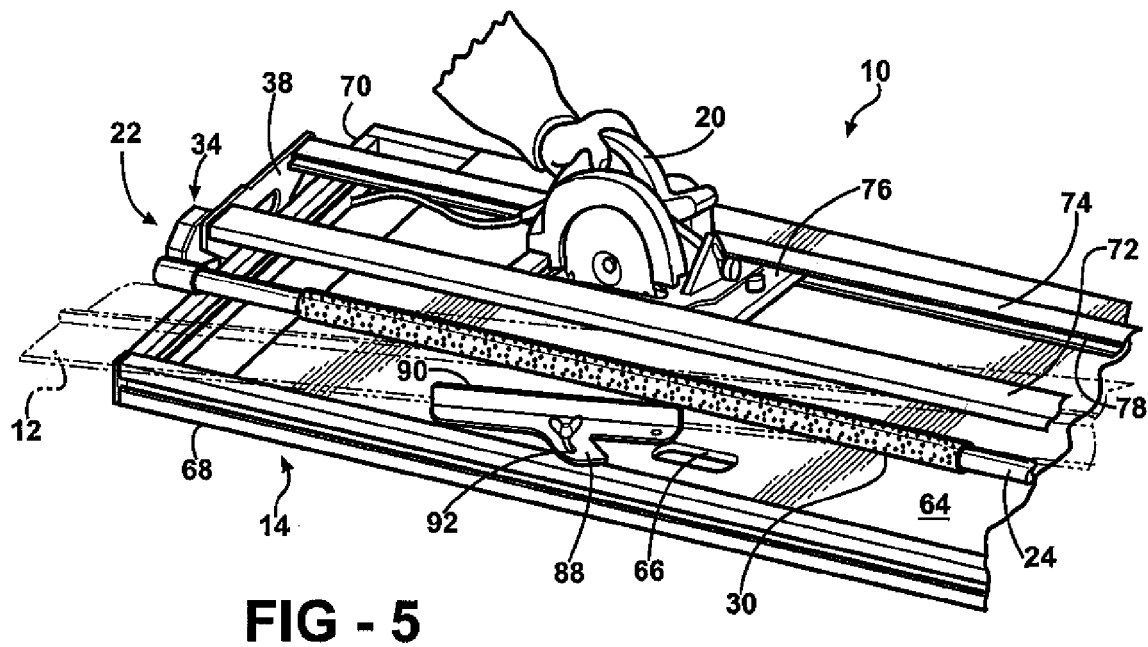
FIG. 5 is another partial perspective view of the saw table of FIG. 1 showing the pivoting arm and the clamping bar relative to the work piece.
Figure 6:
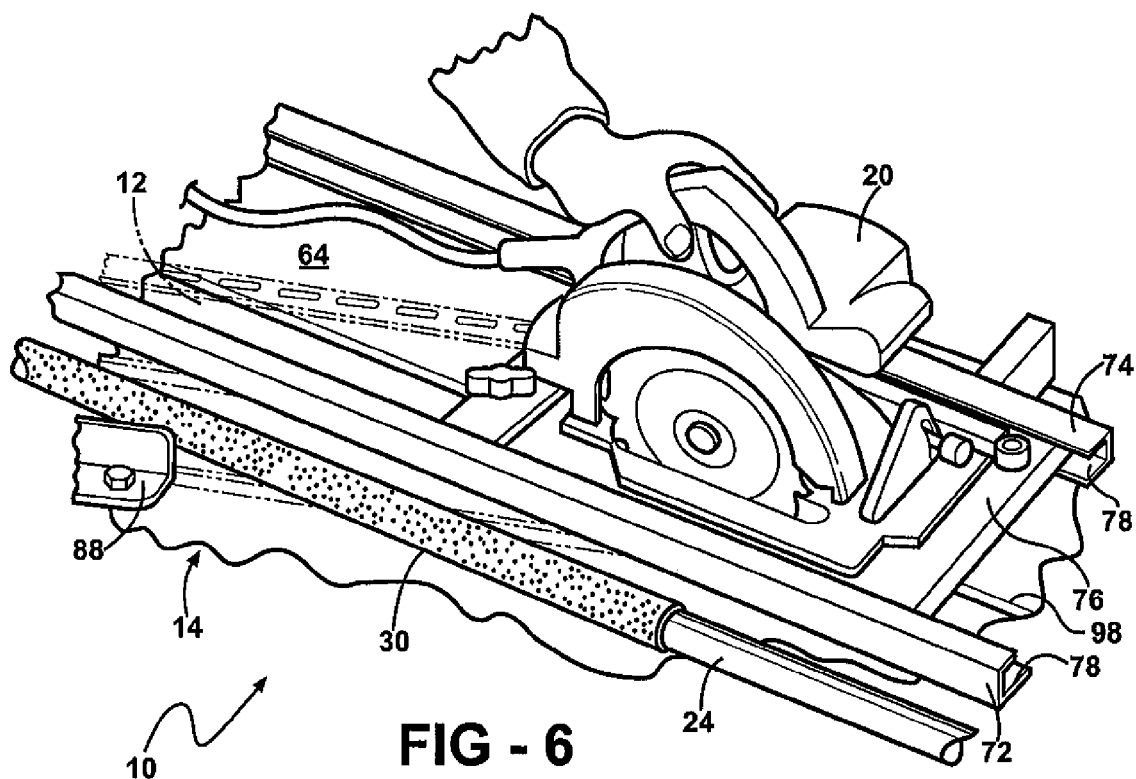
FIG. 6 is another partial perspective view of the saw table of FIG. 1 showing the saw cutting the work piece.

As shown in FIGS. 4-6, a saw 20 or circular saw 20 may be used to perform the cutting operation. It should be noted that other types of saws 20 may be used to work on different types of materials. Additionally, the saw 20 may be outfitted with different types of blades, e.g., a masonry blade, to cut different types of materials.

The saw table 10, as shown in the Figures, is lightweight and portable, i.e., it may be moved from jobsite to jobsite with ease. The saw table 10 may be supported by a pair of sawhorses (not shown) or other work table supports or may be placed on the ground. Thus, breakdown is fast and very time efficient.

The saw table 10 includes a clamping mechanism 22 for clamping the work piece 12 and preventing the work piece 12 from moving to make cutting of the work piece 12 more accurate, safe, and efficient, as compared to saw tables without the clamping mechanism 22. The clamping mechanism 22 includes a clamping bar 24 that has a first end 26 and a second end 28. A longitudinal axis L is defined between the first 26 and second 28 ends. The clamping bar 24 extends across the table base 14 between the first 26 and second 18 base ends to clamp the work piece 12 regardless of position of the work piece 12 between the first 26 and second 18 base ends. Furthermore, by extending across the table base 14, the clamping bar 24 may sufficiently contact the work piece 12 to prevent the work piece 12 from rotating without the need for additional clamping mechanisms 22.

The clamping bar 24 has a cylindrical shape, since clamping bars having sharp edges may damage the work piece 12. In addition, a sleeve 30 is disposed about the clamping bar 24 for frictionally engaging the work piece 12 and for further preventing damage to the work piece 12 as a result of contact with the clamping bar 24. The sleeve 30 is formed from a polymer such as rubber; however, other materials that will accomplish the above-stated purposes of frictionally engaging the work piece 12 and preventing damage to the work piece 12 may also be suitable for the sleeve 30.

The clamping mechanism 22 further includes a first pivoting arm 32 and, preferably, a second pivoting arm 34 that mirrors the first pivoting arm 32. The first pivoting arm 32 is operatively connected to the first end 26 of the clamping bar 24, and the second pivoting arm 34 is operatively connected to the second end 28 of the clamping bar 24. The operative connection is discussed in further detail below. The pivoting arms 32, 34 pivotally support the clamping bar 24 at the first 26 and second 18 base ends, respectively, of the table base 14 for pivotal movement about a pivot axis A that is parallel to the longitudinal axis L.

Figure 2:
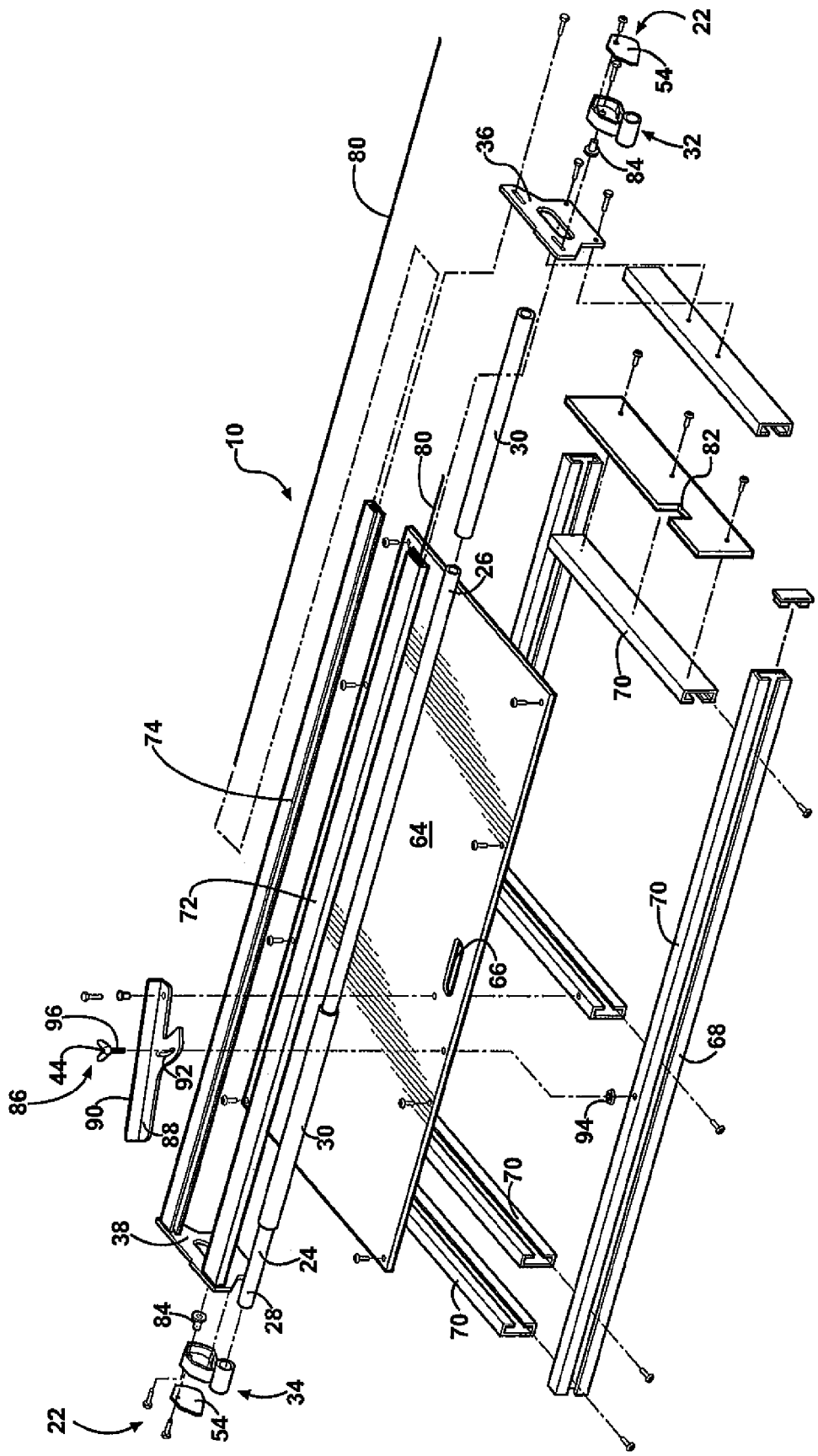
FIG. 2 is a an exploded view of the saw table of FIG. 1.
Figure 3:
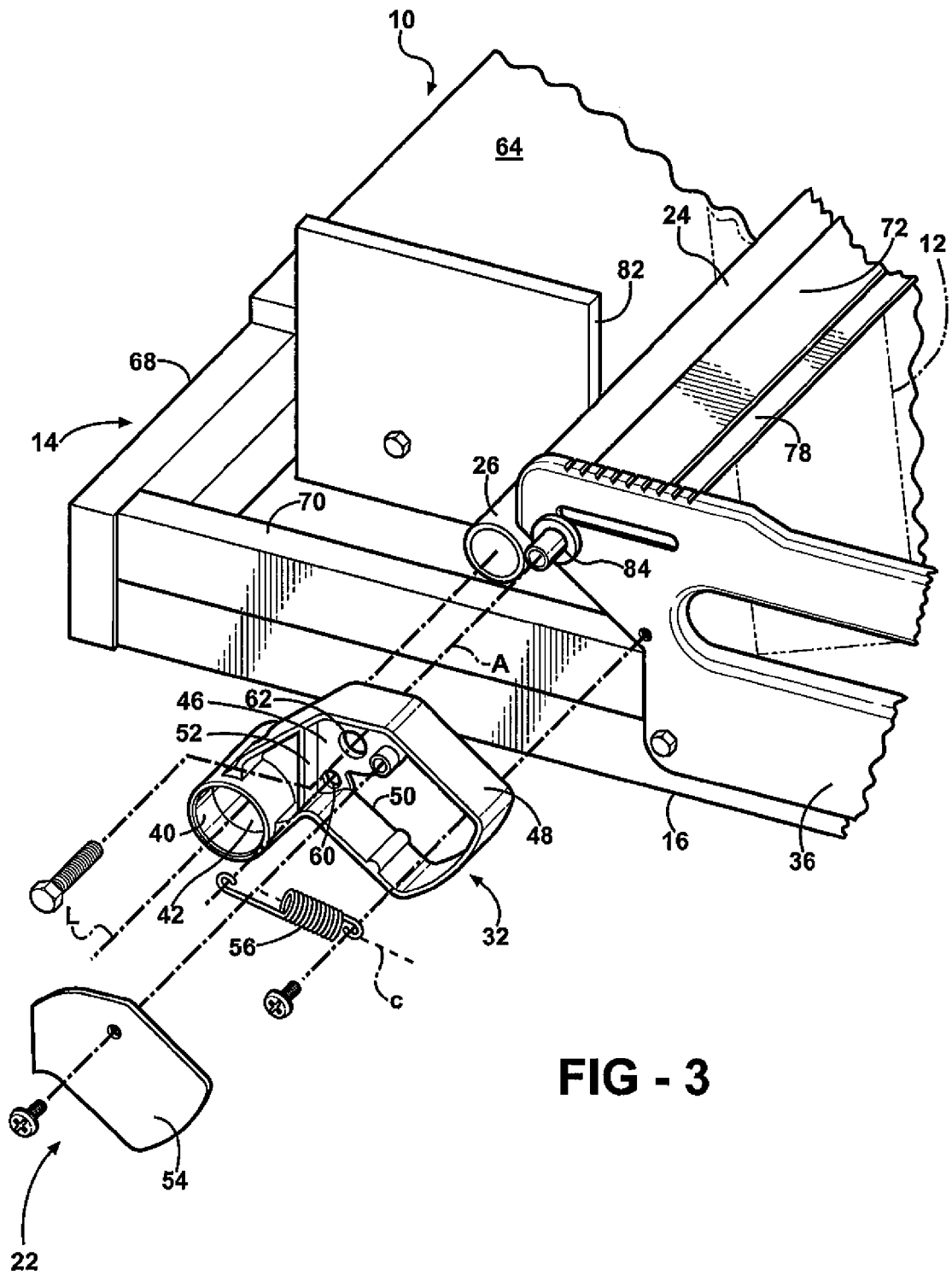
FIG. 3 is a partially exploded view of a pivoting arm of the clamping mechanism of FIG. 1.

Referring to FIGS. 1 and 2, each of the arms 32, 34 includes a socket 40 for receiving the respective first 26 and second 28 ends of the clamping bar 24 to operatively connect the clamping bar 24 to the pivoting arms 32, 34. As best shown in FIG. 3, the socket 40 is cylindrical in shape, which allows the clamping bar 24 to rotate within the socket 40. As a result, during use of the clamping mechanism 22 to clamp the work piece 12, the work piece 12 may be slid out from under the clamping bar 24, with such sliding aided by the rotation of the clamping bar 24. By rotating during the sliding of the work piece 12, scuffing or other damage to the work piece 12 due to contact with the clamping bar 24 is also avoided.

Referring to FIG. 3, each socket 40 includes an end wall 42 extending transverse to the longitudinal axis L for abutting and restricting movement of the ends 26, 28 of the clamping bar 24 along the longitudinal axis L. The end walls 42 of the respective sockets 40 sandwich the clamping bar 24, which prevents the clamping bar 24 from falling out of or sliding through the sockets 40. In other embodiments, a ledge, tab, etc. (none of which are shown) may be used instead of the end walls 42 to prevent the clamping bar 24 from moving along the longitudinal axis L.

As shown in FIG. 3, each of the pivoting arms 32, 34 further includes a lever wall 46 that extends transversely to the longitudinal axis L from the socket 40 to the pivot axis A. The pivoting arms 32, 34 are connected to the table base 14 through the lever wall 46, which is described below in further detail. Each of the pivoting arms 32, 34 further includes a peripheral housing wall 48 that extends parallel to the longitudinal axis L and transversely from the socket 40 and the lever wall 46. The housing wall 48 encloses the lever wall 46 and extends beyond the lever wall 46 to define an opening 50 between the lever wall 46 and the housing wall 48. Each of the arms 32, 34 further includes a support wall 52 that extends across the lever wall 46 between the socket 40 and the housing wall 48 to reinforce the pivoting arms 32, 34 and to prevent the socket 40 from breaking away from the housing wall 48 during operation of the clamping mechanism 22. A cover 54 extends parallel to the lever wall 46 on each of the pivoting arms 32, 34 and closes the housing wall 48 for preventing debris or other foreign objects from entering inside the housing wall 48.

A spring 56 biases the clamping bar 24 about the pivot axis A toward the table base 14 to clamp the work piece 12 between the clamping bar 24 and the table base 14. Other biasing devices may also be suitable, such as a flexible arm, piston, etc. (none of which are shown). The spring 56 is disposed about a center axis C, and provides a biasing force along the center axis C. Alternatively, it is to be appreciated that the spring 56 may provide the biasing force transverse to the center axis C. Preferably, each pivoting arm 32, 34 includes the spring 56; however, the spring 56 is necessary in only one of the pivoting arms 32, 34 to provide the biasing force to the clamping bar 24.

One end of each spring 56 is connected to the respective pivoting arm 32, 34. More specifically, each lever wall 46 defines a first hole 60, and one end of the spring 56 extends through the hole 60 for connecting the end of the spring 56 to the lever wall 46. In other embodiments, the spring 56 may be connected to the pivoting arm 32, 34 through an alternative connection, such as by wrapping around a post 44 or tab (neither of which connections are shown).

The spring 56 extends in tension through each of the openings 50 defined by the housing wall 48 and the lever wall 46 of the pivoting arm 32, 34, between the lever wall 46 on the one end and an adjacent track support 36, 38, which will be described in further detail below, on the other end. The spring 56 is connected to the track support 36, 38 by a screw, bolt, or other fastener. Thus, the springs 56 are pulled or retracted as the pivoting arms 32, 34 move.

The spring 56 resists pivotal movement of the clamping bar 24 in the opposite direction of the table base 14 about the pivot axis A. As a result, the clamping bar 24, in a starting position, is in contact with the table base 14, and any movement of the clamping bar 24 away from the table base 14 is met with resistance from the spring 56. It is to be appreciated that when the sleeve 30 is present, the sleeve 30 is in contact with the table base 14 in the starting position. Thus, in operation, the clamping bar 24 may be lifted to slide the work piece 12 under the clamping bar 24 and into a desired position for cutting, which is shown in FIGS. 4 and 5. The clamping bar 24 may then be released to clamp the work piece 12 to the table base 14 in preparation for cutting the work piece 12, which is shown in FIG. 6.

The clamping mechanism 22 enables work pieces 12 of various thicknesses to be clamped between the clamping bar 24 and the table base 14. More specifically, the clamping mechanism 22 provides a sufficient clamping force to clamp relatively thin work pieces 12 between the clamping bar 24 and the table base 14 to prevent rotation of the work piece 12 when contacted by the saw 20. For work pieces 12 of relatively greater thicknesses, the clamping mechanism 22 provides an insufficient biasing force to damage or deform the work piece 12. Thus, the clamping mechanism 22 is self-adjusting to the thickness of the work piece 12 to be clamped.

As discussed in further detail below, the saw 20 is allowed to travel between a first position and a second position along the saw table 10. The work piece 12 may be positioned relative to the saw 20 such that the desired cut may be performed. During cutting, the work piece 12 does not move relative to the saw table 10; only the saw 20 moves. This, in addition to the clamping mechanism 22, makes cutting more accurate and safe.

Referring to FIGS. 1 and 2, the table base 14 includes a work surface 64, such as treated plywood, for supporting the work piece 12. However, those skilled in the art will recognize that the work surface 64 may be made from a variety of suitable materials. The work surface 64 may define an oblong slot 66, which functions as a handle for allowing a user to carry the saw table 10. A pre-cut groove 98 may be preformed in the work surface 64 to prevent the saw 20 blade from cutting through and damaging the work surface 64 during operation of the saw 20.

As best shown in FIGS. 1 and 2, the table base 14 may also include a metal frame 68 that includes a series of beams 70 that are formed from aluminum. The frame 68 may be disposed adjacent a periphery of the table base 14 for reinforcing the work surface 64, with additional beams 70 disposed beneath the table base 14 for providing additional support.

In addition to the clamping mechanism 22 and the table base 14, the saw table 10 further includes a first track 72 and, preferably, a second track 74 both supported by the table base 14 and extending parallel to the longitudinal axis L between the first 26 and second 18 base ends and spaced from the table base 14. Due to the rigid nature of the frame 68 that supports the work surface 64, the tracks 72, 74 are supported by the frame 68 of the table base 14. A saw cradle 76 is slidably mounted on the first 72 and second 74 tracks for movement between the first position and the second position, as set forth above, and for supporting the saw 20. The first 72 and second 74 tracks are fixed with respect to the table base 14, in which case the saw cradle 76 travels a fixed linear path between the first and second positions.

The tracks 72, 74 define opposing grooves 78 that receive opposite sides of the saw cradle 76 and prevent the saw cradle 76 from separating from the tracks 72, 74. The first 72 and second 74 tracks further include an insert 80 disposed in each groove for protecting the grooves 78 from wear. The insert 80 is preferably made of plastic, but may be made of other materials.

A first track support 36 and a second track support 38 are mounted to the first 26 and second 18 base ends, respectively. The track supports 36, 38 mount the first 72 and second 74 tracks on the table base 14 at the respective first 26 and second 18 base ends, and space the tracks 72, 74 from the table base 14 to allow the work piece 12 to be slid beneath the tracks 72, 74. More specifically, the track supports 36, 38 are mounted to the frame 68 of the table base 14 at the respective base ends 16, 18. Thus, the work piece 12 may be positioned in the path of the saw cradle 76 such that as the saw cradle 76 is slid along the tracks 72, 74, the saw 20 cuts the work piece 12 at the desired angle. Optionally, a mid-track support 36, 38 may also be mounted to the table base 14 to reinforce the tracks 72, 74 and to prevent the tracks 72, 74 from bending as the saw cradle 76 moves along the tracks 72, 74. The mid-track support 36, 38, when present, defines a notch 82 adjacent to the clamping bar 24 for preventing the mid-track support 36, 38 from impeding the movement of the clamping bar 24.

As previously stated, the pivoting arms 32, 34 pivotally support the clamping bar 24 at the first 26 and second 18 base ends, respectively, of the table base 14. More specifically, the pivoting arms 32, 34 are mounted on the respective track supports 36, 38, opposite the tracks 72, 74. However, it is to be appreciated that other mounting arrangements are also possible for the pivoting arms 32, 34, such as mounting the pivoting arms 32, 34 directly to the table base 14 or to the tracks 72, 74. A bushing 84 is mounted on and extends outwardly from each of the track supports 36, 38 for pivotally mounting the pivoting arms 32, 34 on the respective track supports 36, 38. Each of the lever walls 46 further defines a second hole 62 for receiving the bushing 84. However, the bushing 84 may support the pivoting arm 32, 34 through other mechanisms 22, 86, such as through a fitting, supplemental bracket, etc. (none of which are shown).

To further aid in the positioning and cutting of the work piece 12, a pivot foot 88 may be rotatably coupled to the table base 14, more specifically, the work surface 64 of the table base 14. The pivot foot 88 includes a work piece 12 abutment edge 90 that defines an acute angle with the longitudinal axis L for accepting an edge of the work piece 12 to align the work piece 12 at the desired angle for cutting. A coupling mechanism 86 is provided for selectively preventing rotation of the pivot foot 88. More specifically, the pivot foot 88 defines an aperture 92 and the coupling mechanism 86 includes a post 44 that passes through the aperture 92 and into the work surface 64 of the table base 14. A nut 94 is embedded in the work surface 64 of the table base 14, and the post 44 includes a threaded portion 96 for engaging the nut 94. Thus, the pivot foot 88 may be allowed to rotate by unscrewing the post 44, and secured in place by screwing the post 44 into the nut 94.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A saw table comprising:

a table base having a first base end and a second base end;

a clamping bar having a first end and a second end defining a longitudinal axis therebetween;

a first track supported by said table base and extending parallel to said longitudinal axis between said first and second base ends and spaced from said table base for supporting a saw cradle;

a second track extending parallel to said first track and spaced from said table base;

a first track support and a second track support mounting said first track on said table base at said respective first and second base ends and spaced from said table base and with said second track mounted on said first and second track supports;

a pivoting arm operatively connected to said first end of said clamping bar to pivotally support said clamping bar at said first base end of said table base for pivotal movement about a pivot axis parallel to said longitudinal axis;

said pivoting arm is pivotally mounted on said track support and comprises:
- a socket for receiving said end of said clamping bar with said socket including an end wall extending transverse to said longitudinal axis for abutting and restricting movement of said end of said clamping bar along said longitudinal axis,
- a lever wall extending transversely to said longitudinal axis from said socket to said pivot axis;
- a peripheral housing wall extending parallel to said longitudinal axis and transversely from said socket and said lever wall with said housing wall extending beyond said lever wall to define an opening between said lever wall and said housing wall; and
- a cover extending parallel to said lever wall and closing said housing wall; and a spring biasing said clamping bar about said pivot axis toward said table base to clamp a work piece between said clamping bar and said table base and resisting pivotal movement of said clamping bar in the opposite direction about said pivot axis, said spring extending through said opening of said pivoting arm between said lever wall and said track support.

2. A saw table as set forth in claim 1 wherein said arm further comprises a support wall extending across said lever wall between said socket and said housing wall.

3. A saw table as set forth in claim 1 wherein said lever wall defines a first hole and one end of said spring extends through said first hole for connecting the end of the spring to the lever wall.

4. A saw table as set forth in claim 1 further including a bushing mounted on and extending outwardly from said track support and said lever wall further defining a second hole for receiving said bushing.

5. A saw table as set forth in claim 1 wherein said spring is disposed about a center axis and provides a biasing force along said center axis.

6. A saw table as set forth in claim 5 wherein said first spring is disposed in tension between one of said arms and said table base.

7. A saw table comprising:
a table base having a first base end and a second base end;
a clamping bar having a first end and a second end defining a longitudinal axis therebetween;
a track supported by said table base and extending parallel to said longitudinal axis between said first and second base ends and spaced from said table base for supporting a saw cradle;
a track support mounting said track on said table base;
a pivoting arm operatively connected to said clamping bar to pivotally support said clamping bar on said table base for pivotal movement about a pivot axis parallel to said longitudinal axis;
said pivoting arm is pivotally coupled to said table base and includes a lever wall extending transversely to said longitudinal axis, a peripheral housing wall extending parallel to said longitudinal axis and transversely from said lever wall to define an opening between said lever wall and said housing wall, and a cover closing said housing wall; and
a biasing device biasing said clamping bar about said pivot axis toward said table base to clamp a work piece between said clamping bar and said table base and resisting pivotal movement of said clamping bar in the opposite direction about said pivot axis, said biasing device disposed between said cover, said lever wall, and said housing wall and extending through said opening of said pivoting arm between said lever wall and said track support.

8. A saw table as set forth in claim 7 wherein said arm is pivotally mounted on said track support.

9. A saw table as set forth in claim 7 wherein said arm further comprises a support wall extending across said lever wall between said socket and said housing wall.

10. A saw table as set forth in claim 7 wherein said biasing device comprises a spring extending through said opening between said lever wall and the said track support.

11. A saw table as set forth in claim 10 wherein said lever wall defines a first hole and one end of said spring extends through said first hole for connecting the end of the spring to the lever wall.

12. A saw table as set forth in claim 7 further including a bushing mounted on and extending outwardly from said track support and said lever wall further defines a second hole for receiving said bushing.

13. A saw table comprising:
a table base having a first base end and a second base end;
a clamping bar having a first end and a second end defining a longitudinal axis therebetween;
a pivoting arm operatively connected to said clamping bar to pivotally support said clamping bar on said table base for pivotal movement about a pivot axis parallel to said longitudinal axis;
said pivoting arm is pivotally coupled to said table base and includes a peripheral housing wall extending parallel to said longitudinal axis and a cover extending transversely to said housing wall to close said peripheral housing wall; and
a biasing device biasing said clamping bar about said pivot axis toward said table base to clamp a work piece between said clamping bar and said table base and resisting pivotal movement of said clamping bar in the opposite direction about said pivot axis, said biasing device disposed between said housing wall and said cover and extending therefrom.

14. A saw table as set forth in claim 13 further including a track supported by said table base and a track support mounting said track on said table base wherein said arm is pivotally mounted on said track support.

15. A saw table as set forth in claim 14 further including a bushing mounted on and extending outwardly from said track support and said pivoting arm further defining a second hole for receiving said bushing.

16. A saw table as set forth in claim 13 wherein said pivoting arm further comprises a lever wall extending transversely to said longitudinal axis from said peripheral housing wall.

17. A saw table as set forth in claim 16 wherein said pivoting arm further comprises a support wall extending across said lever wall between said socket and said peripheral housing wall.

18. A saw table as set forth in claim 16 wherein said peripheral housing wall extends beyond said lever wall to define an opening between said lever wall and said housing wall.

19. A saw table as set forth in claim 18 wherein said biasing device comprises a spring extending through said opening between said pivoting arm and said track support.

20. A saw table as set forth in claim 19 wherein each of said lever wall defines a first hole and one end of said spring extends through said hole for connecting the end of the spring to the lever wall.

* * * * *